Jan. 16, 1968 W. S. RAYNOR 3,363,742
SELECTIVE DELIVERY CONVEYER
Original Filed Nov. 5, 1963 3 Sheets-Sheet 1

INVENTOR.
WARREN S. RAYNOR
BY
Browne, Schuyler, and Beveridge
ATTORNEYS.

INVENTOR.
WARREN S. RAYNOR

Jan. 16, 1968 W. S. RAYNOR 3,363,742
SELECTIVE DELIVERY CONVEYER
Original Filed Nov. 5, 1963 3 Sheets-Sheet 3
FIG. 6
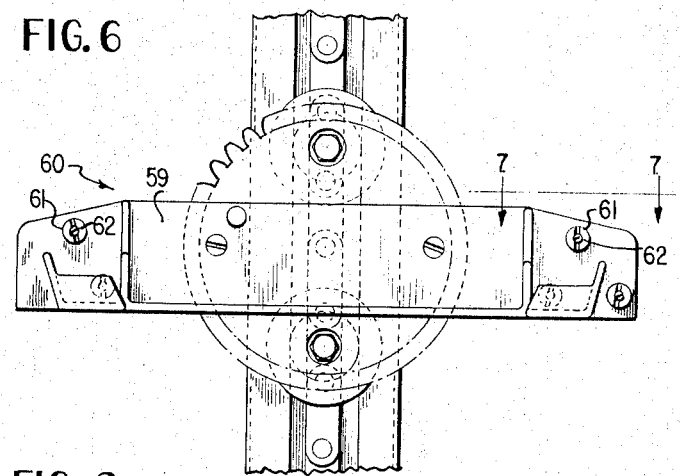
FIG. 7
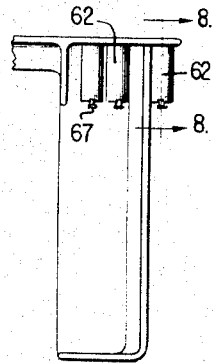
FIG. 8
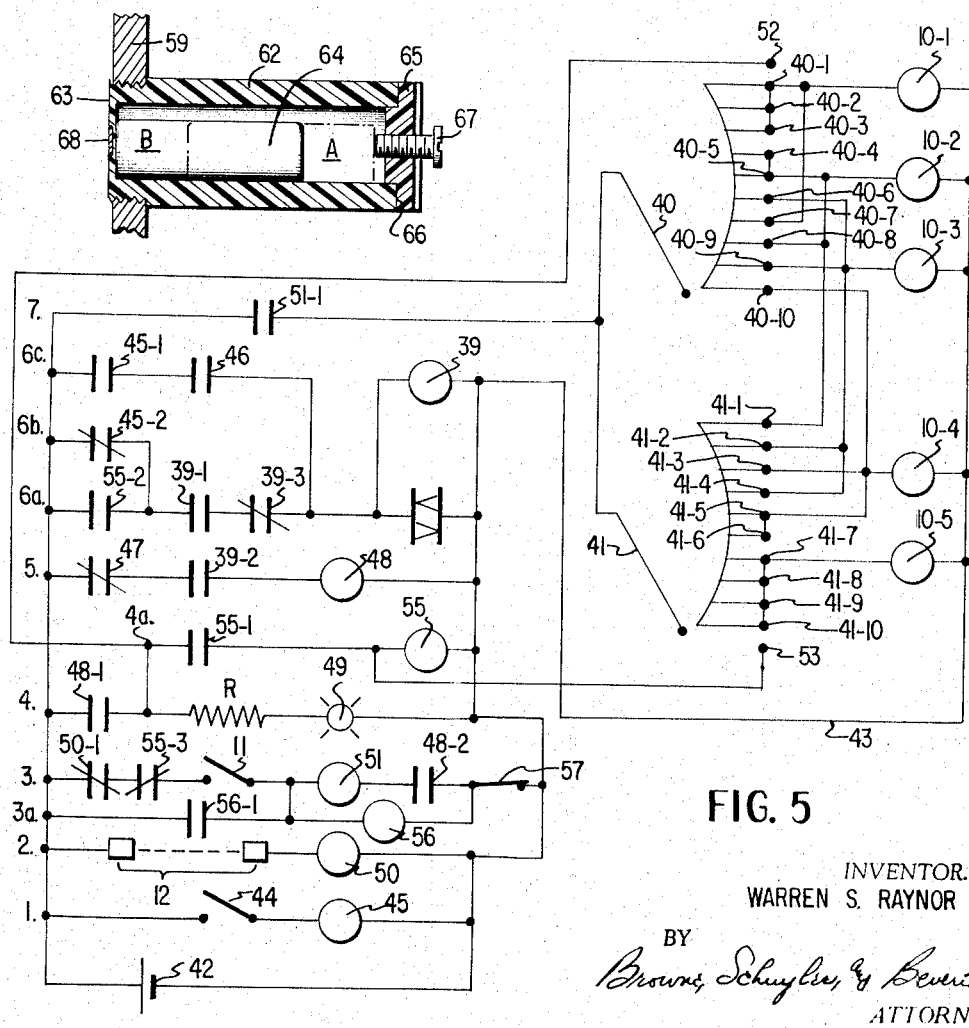
FIG. 5
INVENTOR.
WARREN S. RAYNOR
BY
Browne, Schuyler, & Beveridge
ATTORNEYS.

United States Patent Office 3,363,742
Patented Jan. 16, 1968

3,363,742
SELECTIVE DELIVERY CONVEYER
Warren S. Raynor, Port Hope, Ontario, Canada, assignor, by mesne assignments, to Rex Chainbelt Inc., a corporation of Wisconsin
Continuation of application Ser. No. 321,503, Nov. 5, 1963. This application Feb. 14, 1966, Ser. No. 540,110
2 Claims. (Cl. 198—38)

This application is a continuation of application Ser. No. 321,503, filed Nov. 5, 1963, now abandoned.

This application relates to selective delivery conveyer systems and more particularly to apparatus for encoding a carrier in accordance with the destination desired, and detecting the code at the destination.

In Canadian Patents 665,953 and 665,954, both issued July 2, 1963, and in co-pending Canadian patent application Number 704,359 there is disclosed and claimed an endless vertical delivery conveyer system in which trays at loading stations positioned at various floor levels are placed, by suitable mechanism, in the path of an approaching carrier mounted on a conveyer. The carriers take the trays, are conveyed up over the top of the system, and on their downward movement pass a number of similarly disposed unloading stations which are provided with apparatus for removing the trays from the carriers.

One of the problems attendant to systems of this type, indeed to all selective delivery systems, is that of ensuring that the conveyed articles will be discharged at the proper station. In the system disclosed in the aforementioned patents and application, station selection is accomplished by a rotating commutator driven in synchronism with the conveyer. The commutator has a number of segments, each coresponding to a carrier, and a number of brushes, those disposed about one-half the commutator periphery corresponding to each loading station, and those about the opposite half of the periphery corresponding to each unloading station. When a carrier is to be loaded, its commutator segment passes under the appropriate loading station brush, and in so doing permits the setting up of certain preparatory circuits. When the commutator segment rotates, as the carrier travels, to the position occupied by the selected unloading station brush, this brush completes the preparatory circuits and the carrier is unloaded.

While the description of this station selection system has been extremely abbreviated, it should be apparent that the circuitry and equipment required can be very complicated and expensive. Thus while such systems have been found to be satisfactory, the invention of the present application provides an improved station selection system which does not require extensive circuitry and equipment.

It is an object of this invention to provide an improved station selection system for a selective delivery conveyer.

It is a further object of this invention to provide a simplified station selection system for selective delivery conveyers in which a destination code is impressed directly on the carrier and an unloading operation is initiated at the destination responsive to detection of the code on the carrier.

It is a further object of this invention to provide a station selection system for a selective delivery conveyer in which individual carriers are magnetically coded at the loading station according to the station desired, and in which an unloading operation at the desired station is initiated responsive to detection of the magnetic code on the carrier.

It is a further object of this invention to provide a station selection system for a selective delivery conveyer in which a magnetic destination code for an article is selected at a loading station, impressed on a carrier conveying the article, and detected at the destination to initiate an unloading operation.

It is another object of this invention to provide a station selection system for a selective delivery conveyer in which selected movable magnetic elements on a carrier are displaced from a first to a second position to impress a destination code on the carrier and in which magnetically operated switches at the destination are actuated by the displaced magnetic elements to initiate an unloading operation.

It is another object of this invention to provide a station selection system for a selective delivery conveyer which is simple, reliable and economical.

In accomplishing these objects a principal feature of the invention resides in the provision, on a carrier mounted on a vertical conveyer, of a plurality of horizontally spaced permanent magnets which are mounted for movement from a first to a second position in a horizontal plane. A similar number of electromagnets are provided at the loading station and are positioned to lie opposite of the permanent magnets when a carrier approaches the station. Upon approach of an unloaded carrier, selected pairs of these electromagnets are energized to displace corresponding pairs of the permanent magnets on a carrier from their first to their second position to impress a destination code on the carrier. At the same time, machinery at the loading station is actuated to load the carrier. A pair of magnetically operated switches are mounted at each unloading station and are positioned adjacent the path of movement described by those permanent magnets which, when displaced, represent that station's destination code. Each pair of switches is connected in series and any one switch is actuated by a corresponding magnet only when that magnet is in its second position. When a loaded carrier reaches its destination the two displaced magnets actuate both switches to complete a circuit which initiates an unloading operation. Before the carrier returns to the loading station it passes adjacent another line of electromagnets which are energized to move the permanent magnets from their second back to their first position, thus erasing the code.

Other objects, features and advantages of the present invention will become apparent by reference to the following detailed description taken in conjunction with the attached drawings in which:

FIG. 5 is a schematic diagram of the circuitry employed in the station selector at the unloading station;

FIG. 6 is a detail view of an alternative embodiment of a carrier assembly as mounted on a conveyer chain;

FIG. 7 is a fragmentary top view of the carrier of FIG. 6; and

FIG. 8 is a sectional view taken along the lines 8—8 of FIG. 7 showing an alternative mounting of a movable magnetic coding element.

Figure 1:
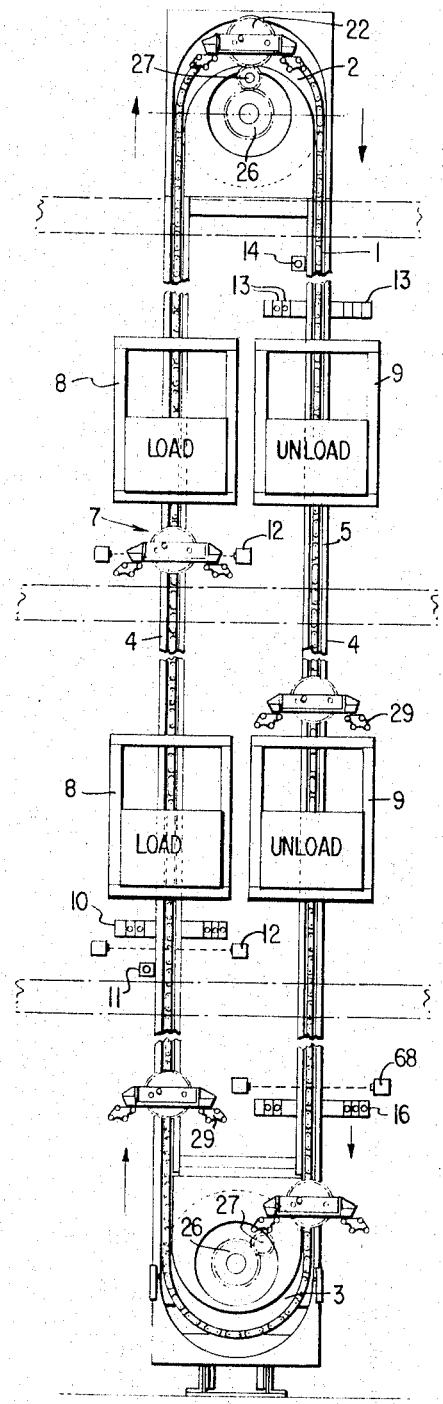
FIG. 1 is a schematic representation of a vertical conveyer system in accordance with the invention.
Figure 2:
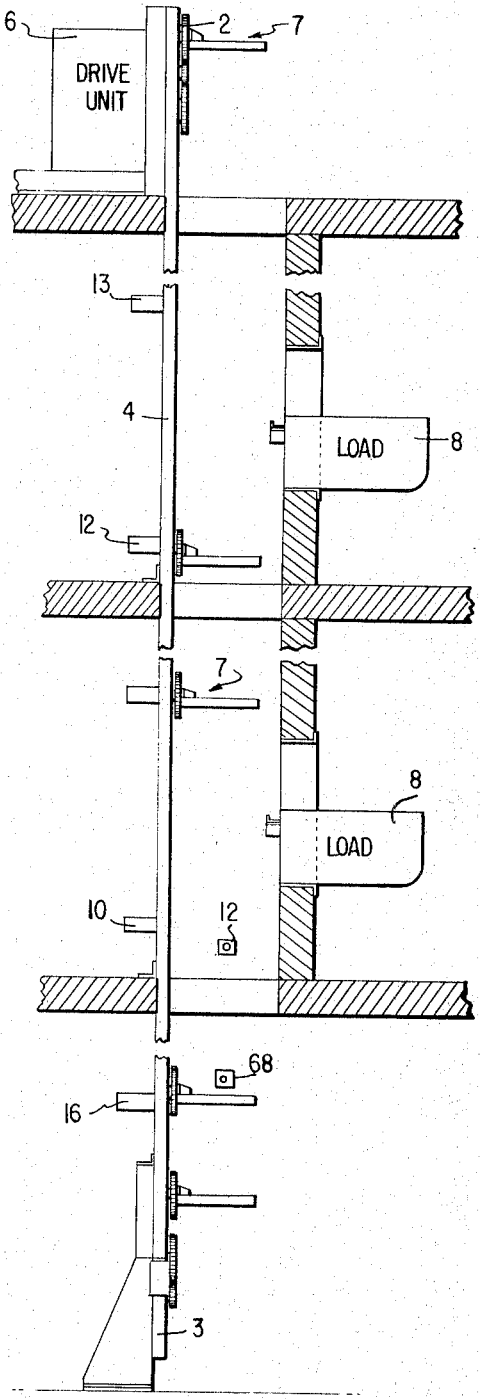
FIG. 2 is a side view of FIG. 1.

Referring now to FIGS. 1 and 2, the conveyer system is illustrated as it might be installed in a multi-floor building. An endless chain 1 is mounted on upper and lower sprockets 2 and 3 and is guided by vertical tracks 4 which have inwardly extending flanges 5 to define an approximately C-shaped cross section. A power source 6 drives upper sprocket 2 and a number of carrier assemblies 7 are mounted at spaced intervals along chain 1.

A loading station 8 and an unloading station 9 are located at each floor of the building. Each loading station 8 is positioned adjacent the upward moving run of chain 1 and includes equipment for placing trays in the path of an approaching carrier. Similarly, each unloading station 9 is positioned adjacent the downward moving run of chain 1 and includes equipment for removing trays from the carriers. Since the unloading and loading equipment forms no part of the present invention, except insofar as the present invention initiates their operation, it is not specifically illustrated. Reference is made to the aforementioned patents and co-pending application for a detailed description of these mechanisms.

As is illustrated in detail in FIGURE 3, immediately below each loading station 8 there is mounted a set of five electromagnetic coding coils 10 together with a magnetically operated detector switch 11 which is vertically displaced from coils 10. Coding coils 10, the circuitry of which will be described in detail subsequently, are employed to impress a destination code on an adjacent carrier assembly 7 while detector switch 11, which may be a magnetically operated reed switch of the type described in U.S. Patent 2,289,830 to Ellwood, forms part of an interlock circuit which prevents operation of the loading machinery or actuation of the coding circuit until the approach of an unloaded carrier. Photocell unit 12 is positioned between coils 10 and switch 11 and casts a beam of light across the path of the carriers to form an additional element of this interlock circuit.

A pair of magnetically operated detector switches 13 and a third switch 14 are positioned immediately above each unloading station 9. These switches are of the same type as switch 11 associated with each loading station 8. Switch 14 detects the approach of a carrier 7 and forms part of an interlock circuit (not shown) while switches 13 detect a code corresponding to their associated unloading station 9 and which is impressed on a carrier assembly 7.

An additional set of electromagnets 16 is positioned near the bottom of the conveyor, and is used to erase the codes from the carriers 7 prior to their upward passage.

Figure 3:
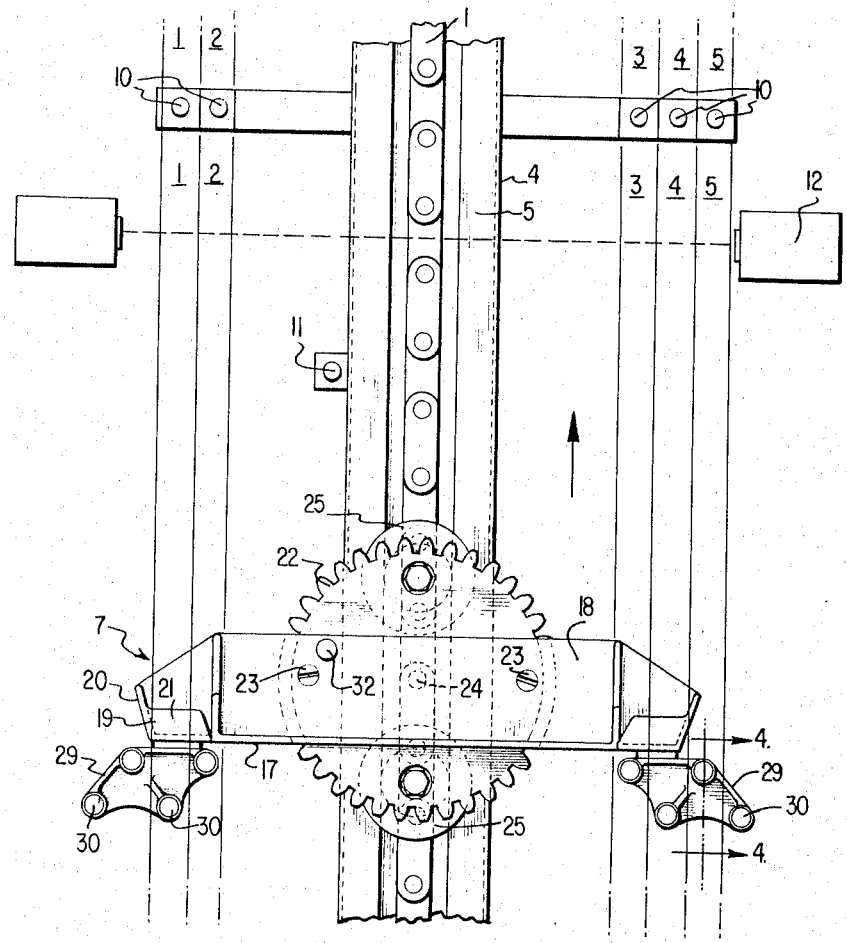
FIG. 3 is a detail view of a carrier assembly as mounted on the conveyer chain.
Figure 4:
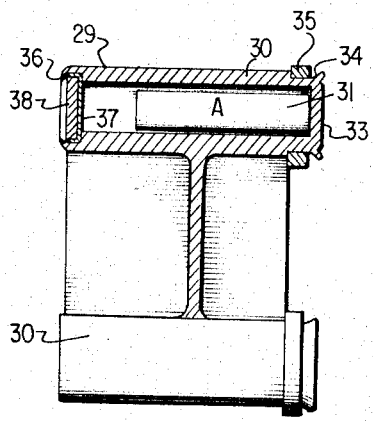
FIG. 4 is a sectional view taken along the lines 4—4 of FIG. 3 showing the mounting of a movable magnetic coding element.

As illustrated in FIGS. 3 and 4, each carrier assembly 7 includes an integrally formed carrier 17 having a vertical back plate 18 and a pair of horizontally extending arms 19 which are flanged at their outboard side 20 and forward ends 21 to define an article receiving recess. Carrier 17 is attached to a large circular gear 22 by bolts 23. In turn, gear 22 is rotatably attached to chain 1 at 24. Guide wheels 25 are rotatably mounted at diametrically opposite positions on gear 22 and are grooved about their periphery to receive and ride on flanges 5 of track 4. Wheels 25 serve to maintain carrier 17 horizontal during its vertical movement along tracks 4, while gear 22 cooperates with fixed gear 26 and planetary gear 27 to maintain orientation during passage of the assembly around upper and lower sprockets 2 and 3.

Referring to the upper portion of FIG. 1, planetary gear 27 is mounted to rotate synchronously with sprocket 2 about fixed gear 26 which is mounted coaxially with sprocket 2. Carrier assemblies 7 are mounted at intervals corresponding to the circumference of sprockets 2 and 3 are positioned so that carrier gear 22 will be engaged by planetary gear 27 as assembly 7 passes horizontal center line 28. As planetary gear 27 rotates about the outboard half of fixed gear 26 it will rotate gear 22 to maintain carrier 17 horizontal. Similar guidance assemblies are provided for movement about lower sprocket 3.

In its preferred embodiment, an integrally formed container 29 of nonmagnetic material is mounted below each arm of carrier 17 and each container is subdivided into four horizontally spaced hollow cylindrical compartments 30. Five of these compartments 30 enclose a slidably movable permanent magnet 31 while the remaining compartments, in this example, are not utilized. The horizontal spacing and positioning of those compartments 30 enclosing a magnet 31 correspond to the horizontal spacing and positioning of coding coils 10 located at loading stations 8. A fixed permanent magnet 32 is mounted in back plate 18 of carrier 17 and extends through circular gear 22. Magnet 32 is positioned to pass adjacent switches 11 at loading stations 8, and adjacent switches 14 at unloading stations 9.

As is shown in FIG. 4, each movable magnet compartment 30 is formed with a closed end 33 having an external annular recess 34 which receives a steel ring 35, and an open end 36 which is sealed with a steel insert 37 and a nonmetallic plug 38. Cylindrical permanent magnet 31 is received within compartment 30 and is dimensioned to permit sliding movement between a first position A, adjacent end 33 and a second position B, adjacent end 36. Steel ring 35 and insert 37 serve to retain magnet 31 in position by magnetic attraction when it is adjacent either element.

By reference to FIGS. 1 and 3, it should be apparent that as each carrier assembly 7 moves vertically on the conveyor, compartments 30 describe a plurality of parallel paths 1 to 5, and each path represents a code digit. Coding coils 10 at loading station 8 are spaced perpendicularly to these paths and each coil 10 is positioned immediately adjacent one of the paths. The critical factor in spacing and positioning of coils 10 and compartments 30 is that the influence of any one coil 10 must be confined to only those movable magnets 31 which travel in the path to which it is immediately adjacent. In this case, this is achieved by sufficient horizontal spacing. Thus, while coding coils 10 at each loading station 8 are shown as being horizontally aligned, they might also be vertically staggered, as are compartments 30. Other suitable configurations should become immediately apparent.

The arrangement of detecting switches 13 at unloading stations 9 is similar to that just described with respect to coding coils 10 of loading stations 8, with the exception that instead of a detecting switch lying immediately adjacent each of the five parallel paths, a switch will be positioned adjacent to only two of the paths, and these paths will vary in accordance with that station's code designation.

Fixed magnet 32 will describe a path similar to that of compartments 30, and detector switches 11 and 14 at loading station 8 and unloading station 9, respectively, are positioned immediately adjacent.

When any movable magnet 31 is displaced from its first to its second position, it will actuate any switch 13 which may be positioned adjacent the path of its container 30. However, when a magnet 31 is in its first position, it will be too remote from switches 13 and will have no effect. In the system illustrated, this selective operation of switches 13 results in a two-out-of-five coding system whose operation is as follows. Each of the five parallel paths described by movable magnet compartments 30 represents a code digit, and each unloading station 9 is assigned a code designation representing two of these digits, no two stations being assigned the same pair of digits. For instance, the first floor may have a designation of path four and path five, while the second floor may have a designation of path three and path five. One switch 13 is placed adjacent each of these assigned paths immediately above the unloading station and the pair are connected in series to an operating circuit. This series connection establishes the requirement that both switches must be actuated before an unloading operation will take place. When a carrier having its path four and path five magnets 31 displaced to their second position approaches the second floor, only the switch 13 adjacent path five will be actuated, and no unloading operation will take place. However, when the same carrier approaches the first floor, both switches 13 will be actuated and the carrier is unloaded.

While magnets 31 are shown as being vertically displaced beneath carrier 17, and switches 13 are shown as horizontally aligned, the natural characteristics of the system are such that the first actuated switch 13 will still be closed when the second switch 13 is actuated. However, where it is desired switches 13 may be positioned with the same vertical, as well as horizontal spacing as their corresponding magnets 31.

Carrier assemblies 7 are coded at the loading stations by selective energization of coding coils 10. For instance, if a tray is to be loaded at floor 8 and unloaded at floor 2, only those coils 10 at floor 8 which lie adjacent paths 3 and 5 will be energized, and when a carrier assembly 7 passes these coils, corresponding magnets 31 will be displaced to their second position. These displaced magnets will, in turn, operate switches 13 when the carrier reaches the second floor unloading station. After carrier assemblies 7 have been unloaded at the unloading stations, all magnets 31 are reset to their first position prior to their upward run by erasing coils 16 which are positioned near lower sprocket 3. However, where a carrier has not been unloaded, e.g., because the unloading equipment is not functioning, a photocell circuit is provided which prevents this reset and the code remains on the carrier for another run.

As was mentioned before, the structure and circuitry of the loading and unloading machinery form no part of this invention and are not specifically illustrated. The actuating circuitry at an unloading station is extremely simple and has not been illustrated. All that is required is that the pair of switches 13 be connected in series to a relay and a power source. The operation of this relay closes an operating circuit to start the unloading machinery. Switch 14 detects the approach of a carrier and forms part of a circuit (not shown) which shuts down the conveyer if the unloading machinery at the station is not in its home position.

The circuitry for a loading station 8 is somewhat more complicated, and is illustrated in FIG. 5. Functions performed by this circuit include:

(1) Setting up a preliminary circuit for the actuation of coils 10 corresponding to the destination desired.

(2) Permitting initiation of the loading cycle and energization of the selected coils only upon existence of the following conditions:

(a) That a tray be in the loading position.
(b) That a carrier is at the loading station.
(c) That the carrier be unloaded.

(3) De-energizing coding coils 10 and resetting the selecting circuit after completion of the loading cycle.

Each loading station 8 is provided with a circuit similar to that shown in FIG. 5, and each such circuit is operated independently. Selection of code coils 10–1 . . . 10–5 is accomplished by a rotary dial type stepping switch schematically illustrated as comprising a stepping relay 39 which rotates a pair of ganged rotary switch arms 40 and 41 in response to dial switch impulses.

Each stepping switch has ten fixed contacts, 40–1 . . . 40–10 and 41–1 . . . 41–10, each representing a different floor and which are connected to code coils 10–1 . . . 10–5 in the following manner:

| Floor | Contact 40– | Coil 10– | Contact 41– | Coil 10– |
| --- | --- | --- | --- | --- |
| 1 | 1 | 4 | 1 | 5 |
| 2 | 2 | 3 | 2 | 5 |
| 3 | 3 | 2 | 3 | 5 |
| 4 | 4 | 1 | 4 | 5 |
| 5 | 5 | 3 | 5 | 4 |
| 6 | 6 | 2 | 2 | 4 |
| 7 | 7 | 2 | 7 | 3 |
| 8 | 8 | 1 | 8 | 4 |
| 9 | 9 | 1 | 9 | 3 |
| 10 | 10 | 1 | 10 | 2 |

Switch arms 40 and 41 are commonly connected to a power source 42 via normally open contact 51–1 while coding coils 10–1 . . . 10–5 are commonly connected to power source 42 via conductor 43.

Before a code may be set up, a tray or tote box must be placed in a loading position at the station. When this is done, load switch 44 closes (which may be accomplished by the simple expedient of a limit switch which is physically depressed by the tray when it is loaded), actuating relay 45 (row 1) parenthetical numbers refer to the horizontal row of switching elemtns of FIG. 6 in which the component appears). Relay 45 in turn closes contact 45–1 (row 6c) and opens contact 45–2 (row 6b) preparing the circuit including dial contact 46 (row 6c) and stepping relay 39 (row 6). Assuming that the fifth floor is the desired destination, a dial (not shown) is then rotated to its fifth position and released. As the dial restores it will, in a well-known manner, intermittently open and close contacts 46 to operate relay 39, thus rotating switch arms 40 and 41 to contacts 40–5 and 41–5, respectively. Movement of switch arms 40 and 41 off their home position also closes switch contacts 39–1 (row 6a). Contact 39–2 (row 5) and normally closed dial contact 47 (row 5), which opens while the dial is operated, is closed to complete a circuit for relay 48 (row 5). Operation of this relay closes contact 48–1 (row 4) to light lamp 49 and also closes contact 48–2 (row 3b).

The circuit is now prepared for operation and awaits the approach of an unloaded carrier.

As mentioned previously, each carrier assembly 7 has a fixed permanent magnet 32 and each loading station 8 has a switch 11 which is actuated by this magnet. The operation of switch 11, which is connected in series with contact 48–2 (row 3b) and relay 51, detects the approach of a carrier. Photocell unit 12, positioned above switch 11, casts a light beam horizontally across the conveyor path perepndicular to tray arms 19 (as shown in FIG. 3) and determines whether the carrier is loaded or unloaded.

The circuit of photocell unit 12 is shown schematically in row 2 of FIG 6. So long as the light beam is uninterrupted relay 50 maintains contact 50–1 (row 3b) closed. Interruption of the light beam will open contact 50–1 and disable the circuit of row 3b, preventing actuation of relay 51. However, if switch 11 is operated *prior* to the interruption of the light beam of photocell unit 12, relay 56 (row 3a) which is connected in parallel with relay 51 and contact 48–2, operates to establish a locking circuit for relay 51 through contact 56–1 and relay 51 then remains actuated regardless of the subsequent opening of switch 11 or photocell relay contact 50–1.

With this circuit arrangement, if the light beam of photocell unit 12 is interrupted throughout the time switch 11 is actuated, relay 51 does not operate, but if the light beam is interrupted *after* switch 11 is actuated relay 51 will operate and remain operated to close contact 51–1, thus completing the circuit to coding coils 10.

In operation, the cargo carried by this system is contained in tote boxes or trays which are a standard item of manufacture of the Mathews Conveyer Co., part number D 3005. These trays are formed with relatively high vertical side and end walls which, when the tray is loaded on the arms 19 of a carrier, extend above vertical back plate 18 and fixed magnet 32. Photocell unit 12 is positioned in the path of carrier assemblies 7 so that its beam is interrupted by the walls of a tray before fixed magnet 32 is closed enough to actuate switch 11. Similarly, magnet 32 is positioned sufficiently high on vertical back plate 18 so that by the time horizontal arms 19 have passed through the light beam, switch 11 has passed from the field of influence of magnet 32 and has released.

Where there is no tray on the carrier, switch 11 is actuated prior to the interruption of the light beam by the carrier itself and relays 51 and 56 operate as heretofore described to close contact 51–1 and energize coils 10–3 and 10–4. These coils in turn cause, by magnetic attraction, displacement of the corresponding magnets from their first to second position, thus encoding the carrier. At the same time, other contacts (not shown) of relay 51 close to initiate a loading operation.

Briefly, the operation of the loading machinery is to place the tray in the path of carrier 17 so that its arms 19 engage the tray within its flanges and lift it off the loader. Similarly, in unloading, the machinery places a receiver in the conveyer path to arrest the tray while the carrier continues to move downwardly.

When the tray has been loaded, load switch 44 opens, releasing relay 45. This opens contact 45–1 and closes contact 45–2, the latter completing a circuit in row 6 including contacts 39–1 and normally closed contact 39–3 (which opens while relay 39 steps but closes between interruptions), to operate relay 39 to step to its home position in a well-known manner. When relay 39 reaches its home position, contact 47 opens, releasing relay 48 which in turn opens contacts 48–1 and 48–2, the former extinguishing signal light 49. In the meantime, operation of the loading machinery has opened a normally closed switch 57 (row 3a) which, after coding elements 31 have been displaced, releases relays 51 and 56 to de-energize coding coils 10–3 and 10–4.

The tray having been loaded, and the selected magnets 31 having been displaced to encode the carrier, the assembly then proceeds upwardly and over upper sprocket 2 to begin its downward run. As assembly 7 approaches each floor, switch 14 at that unloading station is actuated by fixed magnet 32 and if the unloading machinery at that station is off its home position, the conveyer will shut down. However, if the machinery is in its proper position, the assembly continues until it reaches the designated station. Both switches 13 at that station are then actuated and the tray is unloaded.

After unloading, assembly 7 continues downwardly to pass five electromagnetic decoding coils 16 which are arranged to displace magnets 31 from their second to their first position, thus erasing any code impressed on carrier assembly 7. Because unloading stations 9 have a limited storage capacity, it sometimes happens that a carrier will not be unloaded in its first pass past the designated station and the tray will remain on the carrier until it is unloaded during a subsequent run. To prevent erasure of the code when a loaded carrier passes coils 16, a photocell unit 68 is positioned above decoding coils 16 and is connected in a circuit (not shown) which maintains coils 16 energized. When a carrier assembly passes through the beam of photocell unit 68, coils 16 are de-energized. Because of the vertical spacing of photocell 68 and coils 16, an unloaded carrier passes through the beam completely before it reaches coils 16 and its code will be removed by the re-energized coils. However, where a carrier is loaded, the added height of the tray will continue the interruption of the light beam until movable magnets 31 have passed coils 16 and the carrier will remain coded.

Where there are fewer than ten floors in the building, the circuit may be modified to provide an automatic reset of relay 39 when a nonexistent floor is dialed. For example, when there are only seven floors in the building, fixed contacts 8, 9 and 10 of switch bank 40 are disconnected from their coding coil 10–1 and are jumpered to contact 52. Similarly, contacts 8, 9 and 10 of switch bank 41 are disconnected from their coils and are jumpered to contact 53. When one of these floors is dialed, a connection is established through contact 48–1 (row 4) (which is closed when switch 39 is stepped off its home position), lead 54, contact 52, stepping switch arms 40, 41 and contact 53, to operate relay 55 (row 4a). In turn relay 55 closes contact 55–1 (row 4a) to complete a latching circuit and 55–2 (row 6a) to complete the operating circuit to step relay 39 to its home position. Relay 55 further opens normally closed contacts 55–3 to prevent operation of relay 51.

An alternative carrier assembly 58 structure is illustrated in FIGURES 6–8 in which back plate 59 of each carrier 60 has five horizontally spaced threaded bores 61 which receive a compartment 62. Compartment 62 is a hollow plastic cylinder threaded and enclosed at one end 63 and receives a cylindrical magnet 64 which is dimensioned to permit sliding movement from a first position A, to a second position B, the former position being shown in phantom. A cap 65 is glued to and covers open end 66 and is provided with an adjustable screw 67 of magnetic material. Screw 67 serves to adjust magnet 64 in its first position A, and, by virtue of its magnetic attraction, serves also to retain magnet 64 in its first position when it is so located by the coding coils 10. A similar function with respect to second position B is performed by an iron insert 68 located at closed end 63.

While a station selection system for a ten story building has been illustrated, the system may be modified to accommodate more or fewer floors. For example, four coding elements are sufficient for a six floor building, while eight elements will accommodate a twenty-eight floor unit.

While a preferred embodiment of the invention has been described and illustrated it is to be understood that it is not intended to be restricted solely thereto, but that is is intended to cover all modifications which would be apparent to one skilled in the art, and which come within the spirit and scope of the invention.

What is claimed is:

1. A selective delivery conveyer system comprising a single vertically movable conveyer; a plurality of carriers mounted on said conveyer for movement thereby; a plurality of loading stations and a plurality of unloading stations; a plurality of permanent magnet coding elements mounted on each of said carriers, each such element being mounted for displacement from a first to a second position in a direction transverse to the direction of carrier movement; means associated with each loading station for shifting a selected group of the coding elements on a carrier from a first position to a second position to establish a destination code for said carrier; interlock means at each of said loading stations operating in response to the approach of an unloaded carrier for actuating said shifting means and for initiating a loading cycle of the loading station; means at each of said unloading stations for detecting a code impressed on said carriers corresponding to the code assigned to the unloading station; means at said unloading stations actuated by said detecting means for initiating an unloading cycle of the unloading station; and means associated with said conveyer for resetting said coding elements from said second position to said first position.

2. The selective delivery conveyer system of claim 1, wherein said resetting means is rendered inoperative by the approach of a loaded carrier.

References Cited

UNITED STATES PATENTS

| | | | |
|---|---|---|---|
| 3,075,653 | 1/1963 | Wales et al. | 198—38 |
| 3,100,040 | 8/1963 | Kleist | 198—38 |
| 3,105,601 | 10/1963 | Smoll | 214—11 |

EDWARD A. SROKA, *Primary Examiner.*

EVON C. BLUNK, *Examiner.*